United States Patent
Eversole

(10) Patent No.: US 8,245,837 B2
(45) Date of Patent: Aug. 21, 2012

(54) CHAIN DISK CONVEYOR CORNER HOUSING

(75) Inventor: Brad Eversole, Tower Hill, IL (US)

(73) Assignee: The GSI Group, LLC, Assumption, IL (US)

( * ) Notice: Subject to any disclaimer, the term of this patent is extended or adjusted under 35 U.S.C. 154(b) by 396 days.

(21) Appl. No.: 12/690,716

(22) Filed: Jan. 20, 2010

(65) Prior Publication Data

US 2010/0187073 A1    Jul. 29, 2010

Related U.S. Application Data

(60) Provisional application No. 61/146,718, filed on Jan. 23, 2009.

(51) Int. Cl.
*B65G 31/04* (2006.01)

(52) U.S. Cl. ........ 198/642; 198/716; 198/719; 198/725; 119/57.1; 119/57.2; 119/57.3

(58) Field of Classification Search ................ 198/716, 198/717, 719, 720, 721, 722, 725, 735.1–735.6, 198/493, 494, 497, 498, 550.8, 550.12, 537, 198/834, 835, 842; 119/57.1, 57.2, 57.3, 119/57.92

See application file for complete search history.

(56) References Cited

U.S. PATENT DOCUMENTS

| | | | | |
|---|---|---|---|---|
| 2,738,765 A * | 3/1956 | Hart | ............................. | 119/57.3 |
| 2,762,495 A * | 9/1956 | Hart | ............................. | 198/716 |
| 2,794,421 A * | 6/1957 | Rose et al. | ................... | 119/57.3 |
| 2,820,540 A * | 1/1958 | Klinzing | ........................ | 198/729 |
| 2,934,199 A * | 4/1960 | Winkler | ....................... | 119/57.2 |
| 3,003,464 A * | 10/1961 | Bailey | .......................... | 119/57.2 |
| 3,105,590 A * | 10/1963 | Polley | .......................... | 198/716 |
| 7,918,330 B2 * | 4/2011 | Bertolini | ...................... | 198/716 |
| 2009/0008223 A1 * | 1/2009 | Fujii | ............................ | 198/813 |

* cited by examiner

*Primary Examiner* — Gene Crawford
*Assistant Examiner* — William R Harp
(74) *Attorney, Agent, or Firm* — Polster, Lieder, Woodruff & Lucchesi, L.C.

(57) ABSTRACT

A corner assembly for a tube conveyor system comprises a housing defining a wheel receiving area and a flow path defining an angle and having ports at opposite ends of said flow path. A wheel is rotatably received in the wheel receiving area. The wheel comprises a rim having an upper surface and a lower surface; at least one pair of spaced apart channels formed in at least one of the upper and lower surfaces of the rim; and at least one flapper pivotally mounted to said wheel inside of said rim. The flapper is freely movable between a first position in which the flapper is aligned with a wall of one of the channels and a second position in which the flapper is aligned with a wall of the other of the channels. Thus, when the wheel rotates, the flapper will sweep any material in the wheel receiving area towards and through one of the channels and into the flow path.

24 Claims, 5 Drawing Sheets

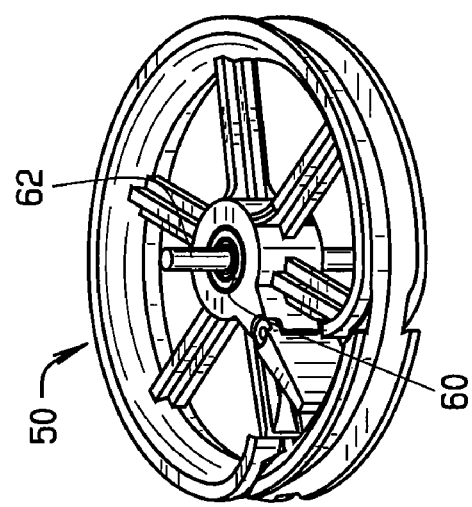
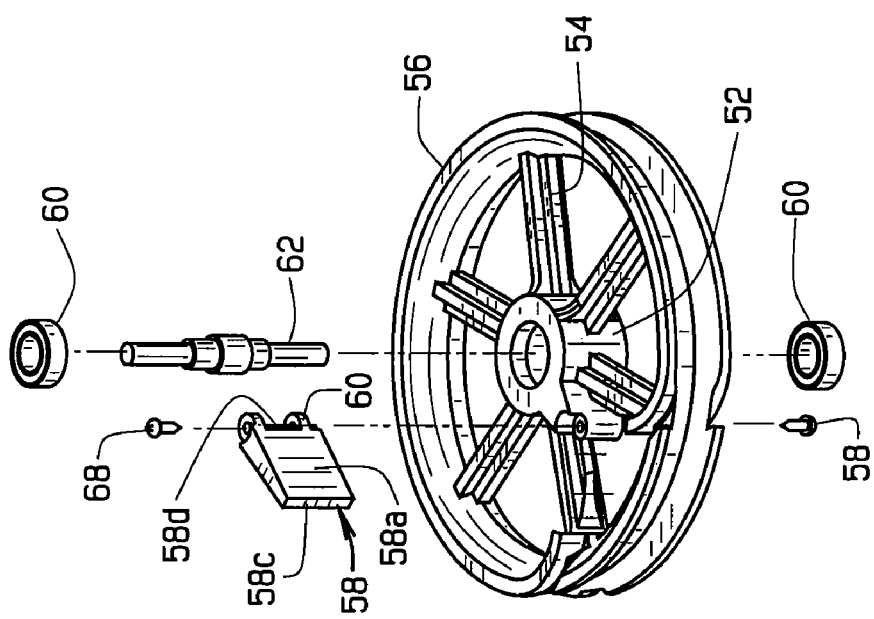
FIG. 7A
FIG. 7B

CHAIN DISK CONVEYOR CORNER HOUSING

CROSS-REFERENCE TO RELATED APPLICATIONS

This application claims priority to U.S. Provisional Application No. 61/146,718 filed Jan. 23, 2009, and which is incorporated herein by reference.

STATEMENT REGARDING FEDERALLY SPONSORED RESEARCH OR DEVELOPMENT

Not Applicable.

BACKGROUND OF THE INVENTION

This disclosure relates to chain disk conveyors (sometimes called tube conveyors, puck conveyors or drag chain conveyors) and, in particular, to a wheel assembly or corner housing for use in such conveyor systems.

Chain disk conveyors typically comprise a plurality of disks dispersed a along a chain. The disks are generally perpendicular to the chain. The chain of disks is received within a tube assembly and is moved through the tube assembly to move particulate material, such as animal feed, through the tube assembly. A main advantage chain disk conveyors is that they provide an enclosed conveying system that can operate at any angle, in any plane and from point to point regardless of what lies between.

As is known, chain disk conveyors comprise a path defined by a tube through which the chain of disks moves. Wheel assemblies are generally provided at the corners when the path turns a corner to facilitate the travel of the chain around corners in the path. The wheel assembly or corner housing generally comprises a rotatable wheel contained within the housing. The wheel and housing define a path along which the chain moves, and thus forms part of the path of the conveyor system. However, particulate matter can get lodged in the housing and begin to interfere with the rotation of the wheel. This can lead to mold growth which is obviously an undesirable condition in animal confinement systems. Further, given enough trapped material, the housing can become packed to such a point as to retard the wheel rotation or stop it altogether. This will cause unnecessary load on the chain loop and drive system, and can cause significant wear on the chain disks. Furthermore, with the housing being opaque, it is difficult to determine the status of the wheel assembly (i.e. how full the wheel area is of particulate matter) and therefore requires a difficult process of disassembly to ensure clean and smooth operation.

BRIEF SUMMARY

Briefly stated, a tube conveyor system comprises at least a two tube sections and a corner assembly connecting said tube sections. The corner assembly defines an angle or corner between the tube sections. The corner assembly comprises a housing defining a wheel receiving area and a flow path defining an angle and having ports at opposite ends of said flow path. As can be appreciated, the tube sections of the conveyor system are connected to the opposite ends of the flow path. A wheel is rotatably received in the wheel receiving area of the housing.

The wheel comprises a rim having an upper surface and a lower surface. At least one pair of spaced apart channels is formed in at least one of the upper and lower surfaces of the rim. The channels of the at least one pair of spaced apart channels face away from each other. At least one flapper is pivotally mounted to the wheel inside of said rim. The flapper is movable between a first position in which the flapper is aligned with a wall of one of the channels and a second position in which the flapper is aligned with a wall of the other of the channels. When the wheel rotates, the flapper will sweep any material in the wheel receiving area towards and through one of the channels and into the flow path. In one embodiment, at least a portion of the housing is transparent or semi-transparent such that the condition of the wheel within the housing can be seen.

The wheel can further include a wall portion at an outer edge of each of the channels of the pair of channels. The wall portions turn inwardly to be directed generally toward a pivot axis of the flapper. The flapper is pivotable between a first position in which the flapper is aligned with a first of the wall portions and a second position in which the flapper is aligned with the other of the wall portions.

According to one aspect of the wheel, the wheel comprises a central hub, an outer ring, and a plurality of spokes extending between the central hub and the outer ring. the wheel rim and wheel outer surface are defined by the outer ring; and the flapper is operatively connected to the central hub. The hub can include a projection to which the flapper is connected. The wall portions and the flapper are sized such that when the flapper is aligned with one of the wall portions, the flapper and wall portion will define a substantially continuous and uninterrupted surface from the hub projection to the channels.

BRIEF DESCRIPTION OF THE SEVERAL VIEWS OF THE DRAWINGS

FIGS. 7A and 7B are exploded and assembled views, respectively of the wheel with associated bearings and shaft.

Corresponding reference numerals will be used throughout the several figures of the drawings.

DETAILED DESCRIPTION OF THE INVENTION

Figure 1:
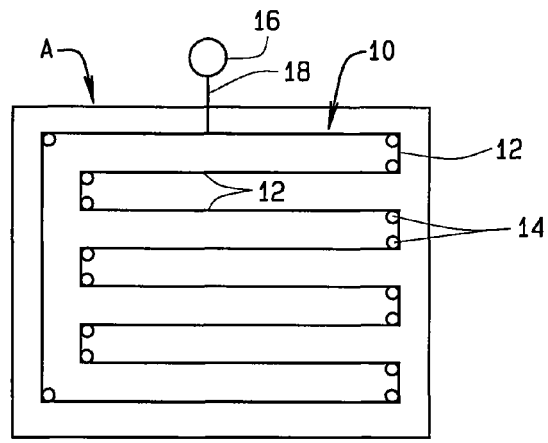
FIG. 1 is a schematic view of an animal feed system.
Figure 2:
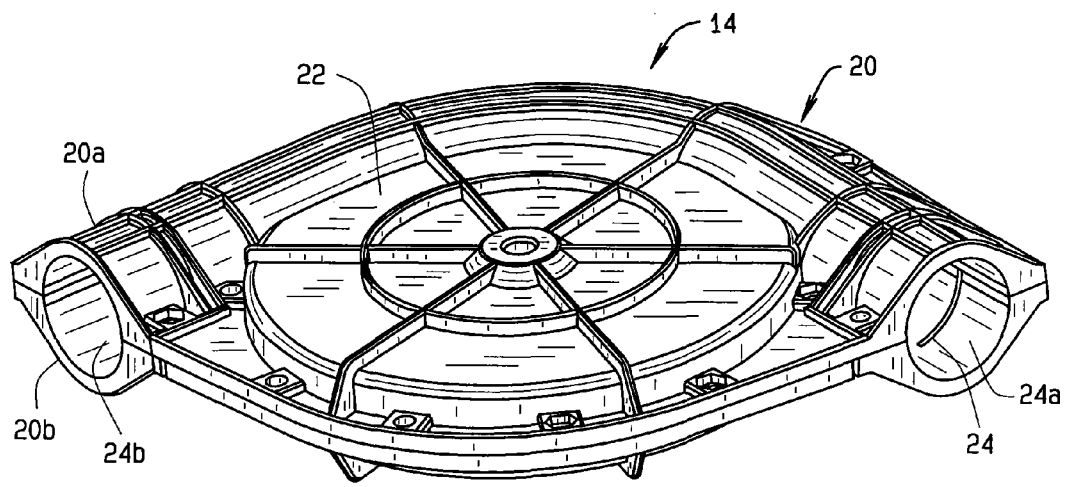
FIG. 2 is a perspective view of a wheel assembly or corner housing for a chain disk conveyor.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what I presently believe is the best mode of carrying out the claimed invention. Additionally, it is to be understood that the invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

An animal feed system 10 in an animal house A is shown schematically in FIG. 1. The feed system comprises series of generally straight tubes 12 connected at their corners by wheel assemblies or corner housings 14. The tubes 12 and wheel assemblies 14 are typically elevated above the floor of the housing. A series of drop tubes (not shown) are positioned along the tubes 12 to deposit feed in feed bins for animals in the animal house A. The feed system defines a continuous path through which a chain disk (not shown) moves to deliver feed to the drop tubes. A feed hopper 16 is located outside of the animal house and delivers feed to the conveyor system via a delivery tube 18.

The wheel assembly 14 is shown in more detail in FIGS. 2-7. The wheel assembly 14 comprises a housing 20 made of an upper housing portion 20a and a lower housing portion 20b. The two housing portions are mirror images of each other. When assembled, the housing portions 20a,b define a wheel area 22 and a flow path 24 having ports 24a,b at opposite ends. As described above, a feed conveyor system comprises a serpentine feed flow path defined by a tube assembly. The tube assembly comprises straight tube lengths which are connected together by wheel assemblies 14 to form corners. Thus, as seen in the figures, the flow path 24 of the wheel assembly defines an angle to facilitate movement of the chain disk conveyor around the corner. In the figures, the wheel assembly 14 effectively joins the tubes at right angles, such that the corner is be a 90° corner. However, it will be apparent that the wheel assembly could be formed to define angles of more than or less than 90°.

As noted above, the housing portions 20a,b are mirror images of each other, and hence only one will be described. The housing portions 20a,b each comprise a flat interior surface 30 having a central opening 32. A wall 34 extends upwardly from, and surrounds, a portion of the surface 30. The wall 34 defines an arc having a radius. The central opening 32 is located at the approximate center of the circle defined by the wall 34. The size (or extent) of the arc defined by the wall 34 will depend on the angle defined by the flow path 24. In the wheel assembly 14 where the flow path illustratively defines an angle of 90°, the wall 34 defines an arc of about 145° to about 155°. An upper surface 36a extends from the upper edge of the wall 34. A trough 38 extends past the flat surface 30, adjacent an edge of the surface 30 where the wall 34 is absent. Preferably, the trough 38 is generally semi-circular in vertical cross-section (i.e., in a plane perpendicular to the surface 30) and defines one-half of the flow path 24. The flow path, therefore, is generally circular in cross-section. A second upper surface 36b, which is co-planar, or level with, the surface 36a extends outwardly from an outer edge of the trough 38. The bottom of the trough 38 is vertically below the level of the surface 30, and the upper outer edge of the trough (where the surface 36b extends outwardly from the trough), is vertically above the surface 30. Stated differently, the bottom of the trough 38 and the surface 36b are vertically spaced in opposite directions from the surface 30.

Figure 3:
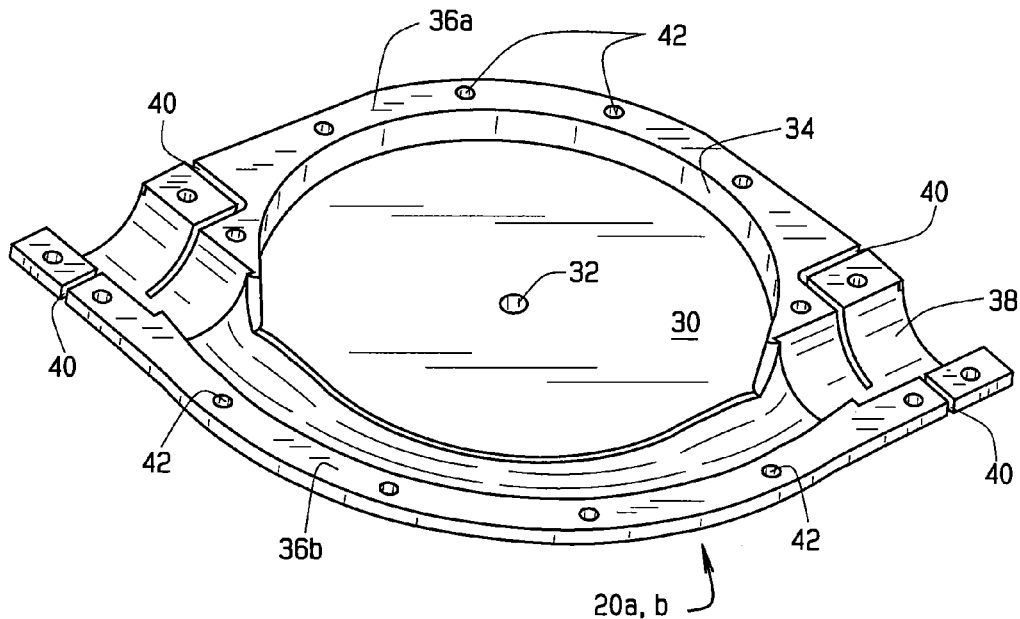
FIG. 3 is a perspective view of the interior of a housing portion of the wheel assembly.

The surfaces 36a,b each have a plurality of holes 42 extending therethrough. As can be appreciated, the holes 42 accommodate bolts or other fasteners to secure the upper and lower housing portions together. When the upper and lower housing portions are assembled together, the opposed troughs will define the flow path 24 and the opposed walls 34 and surfaces 30 will define the wheel receiving area 22. As seen in FIG. 3, slots 40 are formed at the ends of the trough in the surfaces 36a,b. The slots 40 allow for some flexibility of the ends of the trough, so that the ends of the trough can be clamped tightly about a feed tube which is received in the ends of the flow path.

Figure 4:
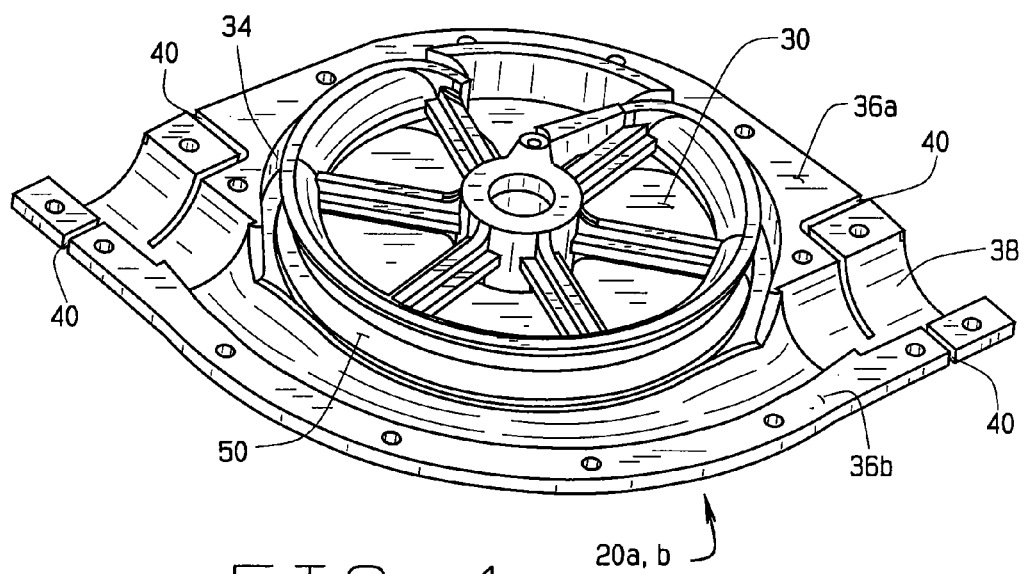
FIG. 4 is a perspective view of the wheel assembly with a top portion of the housing removed to show the wheel of the wheel assembly.
Figure 5:
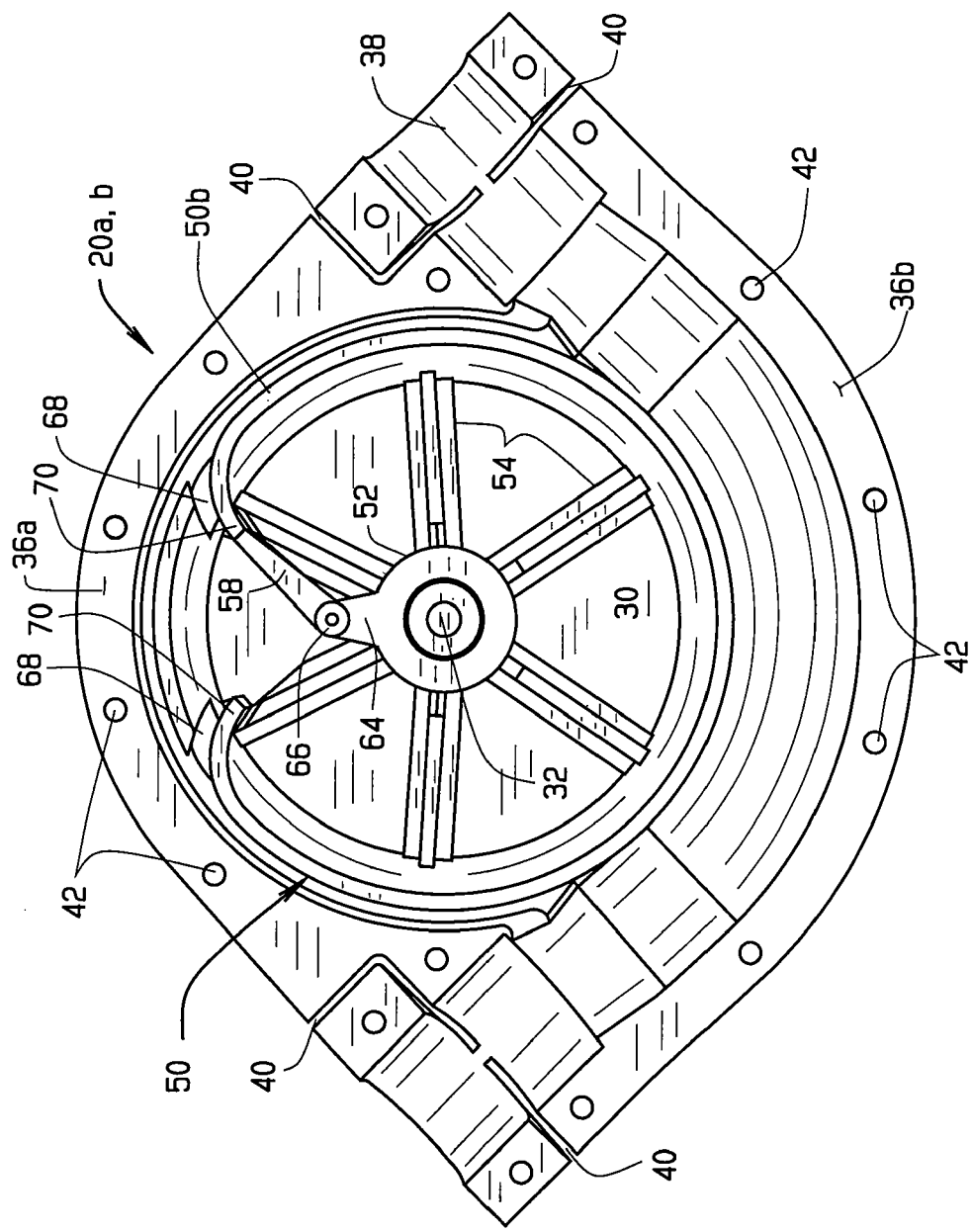
FIG. 5 is a plan view of the wheel positioned on a portion of the housing.

A wheel 50 is received in the wheel receiving area. The wheel 50 is shown in FIGS. 4-5 resting on the housing surface 30, and is shown in more detail in FIGS. 6-7B. The wheel 50 comprises a central hub 52, a plurality of spokes 54 which radiate outwardly from the hub 52, a rim 56 extending around the spokes and a flapper 58 pivotally mounted to the hub 52. The hub 52 is hollow to receive a pair of bearings 60 and a shaft 62 which is journaled in the bearings 60. (FIGS. 7A-B). In the wheel assembly 14, the ends of the shaft 62 are received in the opposed holes 32 in the opposed surfaces 30 of the upper and lower housing portions 20a,b. The bearings 60 mount the wheel 50 to the bearings 60 to facilitate rotation of the wheel about the shaft 62, and hence relative to the housing portions 20a,b. The hub 52, rim 56 and flapper 58 each have a height slightly less than the combined height of the opposed walls 34, such that in an assembled wheel assembly 14, an upper surface of the wheel 50 will be proximate the surface 30 of the housing upper portion 20a and a lower surface of the wheel 50 will be proximate the surface 30 of the housing lower portion 20b, yet the wheel will be able to rotate freely in the housing about the axle 62. The spokes 54, however, have a height that is less than the height of the hub, flapper and rim. The wheel rim 56 has an outer surface 56a which is concave, and defines an arc having a radius approximately equal to the radius of the arc of the troughs 38. Thus, as can be appreciated from FIG. 4, the outer surface of the wheel rim will define a portion of the flow path 24.

Figure 6:
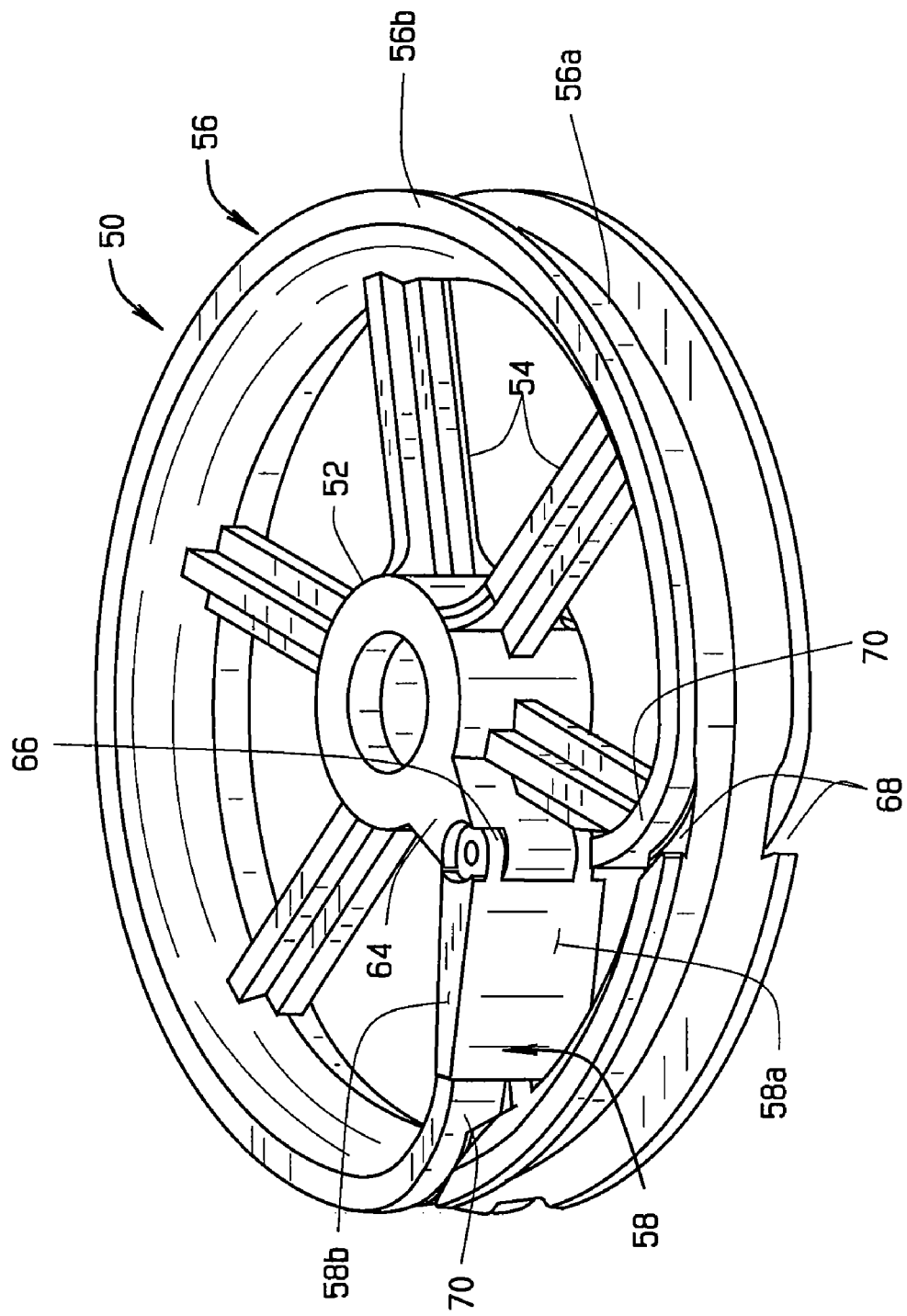
FIG. 6 is a perspective view of the wheel.

As noted above, the flapper 58 is pivotally mounted to the wheel hub 52. The hub 52 includes a radially extending projection 64, having upper and lower portions cut-away, as seen in FIG. 7A. The flapper 58 has side walls 58a, top and bottom surfaces 58b, a front wall 58c and a back wall 58d. A pair of spaced apart lugs 66 extend rearwardly from the back wall 58d. The opposed lugs are received over the upper and lower surfaces of the cut away portion of the projection 64, and the flapper 58 is pivotally secured to the projection 64 by means of fasteners 68, such as screws, bolts, pins, or the like. The projection 64 and the flapper 58 are shaped and formed such that when the flapper is pivotally connected to the projection, the flapper can freely pivot relative to the projection about an axis defined by the fasteners 68. Thus as seen in FIGS. 6 and 7A, the wall of the cut-away portion of the projection 64 is curved, to receive the curved outer surface of the lugs 66. Additionally, the forward surface of the projection 64 is rounded, and corresponds generally to the curved or concave back surface of the flapper 58.

The wheel rim has upper and lower surfaces 56b. Two arced grooves or channels 68 are formed in at least one of, and preferably both of, the upper and lower surfaces 56 of the wheel rim. The channels 68 arc or face away from each other. Illustratively, the two arcs are shown to be proximate a pair of adjacent spokes 54. However, depending on the number of spokes, the two channels may not be adjacent spokes. At the outer ends of the channels 68, the wheel upper surface includes a wall portion 70 which turns inwardly. The arc defined by the portion of the rim between the channels 68 is bisected by a radial line extending from the center of the wheel hub 52 through the wheel projection 64. The flapper 58 is pivotable such that it can be aligned with either of the wall portions 70. The wall portions 70 and the flapper 58 are sized such that when the flapper is aligned with one of the wall portions 70, the flapper and wall portion will define a substantially continuous and uninterrupted surface from the hub projection to the channels 68, as seen in FIG. 5.

As discussed above, when a wheel assembly is used in a chain disc conveyor system, particulate matter can get lodged in the wheel receiving area, and, once sufficient particulate matter is in the wheel receiving area, the rotation of the wheel will be impeded, which, in turn, can impede the operation of the conveyor system. As noted above, in the wheel assembly 14, the flapper 58, hub 52 and rim 56 all extend substantially the full distance between the surfaces 30 of the housing portions 20a,b. The spokes 54, however, are shorter in height. In operation, the projection 64, flapper 58 and wall portion 70 will define a guide that will sweep material that enters the wheel receiving area through the channels 68 and back into the flow path 24. With reference to FIG. 5, the flapper 58 is oriented to sweep material into the channel on the right (with reference to FIG. 5) when the wheel is rotating counter-clockwise (again, with reference to FIG. 5). However, because the flapper 58 is pivotable, if the wheel as shown in FIG. 5 were rotated in a clockwise direction, the flapper would automatically be pivoted to the left (with reference to FIG. 5) to sweep material out through the channel on the left side (again with reference to FIG. 5). Hence, the flapper will automatically adjust to the proper orientation or position, depending on the direction in which the wheel is rotated. Therefore, when installing the wheel assemblies 14 in a conveyor system, the installers need not be concerned about the orientation of the wheel.

So that the self-cleaning capabilities of the wheel assembly, the general cleanliness of the housing and the free rotation of the wheel within the housing can be confirmed, at least a portion of the housing 20 can be constructed of a transparent or semi-transparent material. For example, both the upper and lower housing portions 20a,b can be made of a transparent or semi-transparent material; only one of the upper and lower housing portions 20a,b can be made of a transparent or semi-transparent material; or a portion of one (or both) of the housing portions 20a,b can be made of a semi-transparent material. For example, the surface 30 could be made of a transparent or semi-transparent material.

As various changes could be made in the above constructions without departing from the scope of the claimed invention, it is intended that all matter contained in the above description or shown in the accompanying drawings shall be interpreted as illustrative and not in a limiting sense. Although the flapper 58 is shown to be connected to the hub projection by means of threaded fasteners, the flapper can be pivotally connected in other ways as well. For example, opposed sockets can be formed in either the flapper lugs 66 or the projection 64, and vertically extending projections (such as domes) can be provided in the other of the flapper lugs and projection, to form a ball-and-socket type connection. As a further alternative, the ball could be a spring biased ball which is urged into the socket. Either of these configurations would allow for a snap connection of the flapper to the projection. Additionally, the number of wheel spokes could be altered as desired. Alternatively, the spokes could be replaced with a plate which extends from the hub to the rim, as long as the plate had a cutout configured to allow for pivoting of the flapper. The wheel 50 is shown with only one flapper 58 and one pair of channels on each side of the wheel. If desired, the wheel 50 could be provided with two or more flappers 58 and two or more pairs of channels on one (or each) edge of the wheel rim. These examples are merely illustrative.

The invention claimed is:

1. A tube conveyor system comprising at least a two tube sections and a corner assembly connecting said tube sections to define an angle or corner between said tube sections; said corner assembly comprising:
   a housing defining a wheel receiving area and a flow path defining an angle and having ports at opposite ends of said flow path; and
   a wheel rotatably received in said wheel receiving area; said wheel comprising:
      a rim having an upper surface and a lower surface;
      at least one pair of spaced apart channels formed in at least one of the upper and lower surfaces of the rim; the channels of said at least one pair of spaced apart channels facing away from each other; and
      at least one flapper pivotally mounted to said wheel inside of said rim; said flapper being movable between a first position in which said flapper is aligned with a wall of one of said channels and a second position in which said flapper is aligned with a wall of the other of said channels; wherein when said wheel rotates, said flapper will sweep any material in said wheel receiving area towards and through one of said channels and into said flow path.

2. The tube conveyor system of claim 1 wherein said wheel includes a wall portion at an outer edge of each of said channels of said pair of channels; said wall portions turning inwardly to be directed generally toward a pivot axis of said flapper; the flapper being pivotable between a first position in which it is aligned with a first of said wall portions and a second position in which it is aligned with the other of said wall portions.

3. The tube conveyor system of claim 1 wherein at least a portion of the housing is transparent or semi-transparent such that the condition of the wheel within the housing can be seen.

4. The tube conveyor system of claim 1 wherein said flow path is generally circular in cross-section perpendicular to an axis of said flow path; said wheel having an outer surface; said flow path being defined in part by said wheel outer surface; said wheel outer surface being curved.

5. The tube conveyor system of claim 1 wherein said wheel comprises a central hub, an outer ring, and a plurality of spokes extending between said central hub and said outer ring; said wheel rim and wheel outer surface being defined by said outer ring; said flapper being operatively connected to said central hub.

6. The tube conveyor system of claim 5 wherein said hub comprises a projection extending from said hub between a pair of spokes; said flapper being pivotally connected to said projection.

7. The tube conveyor system of claim 6 wherein said wall portions and the flapper are sized such that when the flapper is aligned with one of the wall portions, the flapper and wall portion will define a substantially continuous and uninterrupted surface from the hub projection to the channels.

8. The tube conveyor system of claim 6 wherein an imaginary line drawn from said center of said hub, through a center of said projection, will bisect the portion of the ring extending between the adjacent spokes between which the projection extends.

9. The tube conveyor system of claim 5 wherein said wheel spokes have a height less than the height of the central hub and less than the height of the ring.

10. The tube conveyor system of claim 5 wherein the wheel rim and central hub are of approximately the same height.

11. The tube conveyor system of claim 10 wherein the wheel rim and hub have height slightly less than the height of the wheel receiving area of the housing.

12. A corner assembly for a tube conveyor system; said corner assembly comprising:
   a housing defining a wheel receiving area and a flow path defining an angle and having ports at opposite ends of said flow path; and
   a wheel rotatably received in said wheel receiving area; said wheel comprising:

a rim having an upper surface and a lower surface;
at least one pair of spaced apart channels formed in at least one of the upper and lower surfaces of the rim; the channels of said at least one pair of spaced apart channels facing away from each other; and
at least one flapper pivotally mounted to said wheel inside of said rim; said flapper being movable between a first position in which said flapper is aligned with a wall of one of said channels and a second position in which said flapper is aligned with a wall of the other of said channels; wherein when said wheel rotates, said flapper will sweep any material in said wheel receiving area towards and through one of said channels and into said flow path.

13. The corner assembly of claim 12 wherein said wheel includes a wall portion at an outer edge of each of said channels of said pair of channels; said wall portions turning inwardly to be directed generally toward a pivot axis of said flapper; the flapper being pivotable between a first position in which it is aligned with a first of said wall portions and a second position in which it is aligned with the other of said wall portions.

14. The corner assembly of claim 12 wherein at least a portion of the housing is transparent or semi-transparent such that the condition of the wheel within the housing can be seen.

15. The corner assembly of claim 12 wherein said flow path is generally circular in cross-section perpendicular to an axis of said flow path; said wheel having an outer surface; said flow path being defined in part by said wheel outer surface; said wheel outer surface being curved.

16. The corner assembly of claim 12 wherein said wheel comprises a central hub, an outer ring, and a plurality of spokes extending between said central hub and said outer ring; said wheel rim and wheel outer surface being defined by said outer ring; said flapper being operatively connected to said central hub.

17. The corner assembly of claim 16 wherein said hub comprises a projection extending from said hub between a pair of spokes; said flapper being pivotally connected to said projection.

18. The corner assembly of claim 17 wherein said wall portions and the flapper are sized such that when the flapper is aligned with one of the wall portions, the flapper and wall portion will define a substantially continuous and uninterrupted surface from the hub projection to the channels.

19. The corner assembly of claim 17 wherein an imaginary line drawn from said center of said hub, through a center of said projection, will bisect the portion of the ring extending between the adjacent spokes between which the projection extends.

20. The corner assembly of claim 16 wherein said wheel spokes have a height less than the height of the central hub and less than the height of the ring.

21. The corner assembly of claim 16 wherein the wheel rim and central hub are of approximately the same height.

22. The corner assembly of claim 21 wherein the wheel rim and hub have height slightly less than the height of the wheel receiving area of the housing.

23. A corner assembly for a tube conveyor system; said corner assembly comprising:
a housing defining a wheel receiving area and a flow path defining an angle and having ports at opposite ends of said flow path; and
a wheel rotatably received in said wheel receiving area; said wheel comprising:
an central hub;
a plurality of spokes extending from said central hub;
a ring around said central hub and connected to said hub via said spokes, said ring defining an outer surface, and a rim having an upper surface and a lower surface;
at least one pair of spaced apart channels formed in at least one of the upper and lower surfaces of the rim; the channels of said at least one pair of spaced apart channels facing away from each other; and
at least one flapper pivotally mounted to said hub; said flapper being movable between a first position in which said flapper is aligned with a wall of one of said channels and a second position in which said flapper is aligned with a wall of the other of said channels; wherein when said wheel rotates, said flapper will sweep any material in said wheel receiving area towards and through one of said channels and into said flow path.

24. The corner assembly of claim 23 wherein said wheel includes a wall portion at an outer edge of each of said channels of said pair of channels; said wall portions turning inwardly to be directed generally toward a pivot axis of said flapper; the flapper being pivotable between a first position in which it is aligned with a first of said wall portions and a second position in which it is aligned with the other of said wall portions.

* * * * *